US006728808B1

(12) United States Patent
Brown

(10) Patent No.: US 6,728,808 B1
(45) Date of Patent: Apr. 27, 2004

(54) MECHANISM FOR OPTIMIZING TRANSACTION RETRIES WITHIN A SYSTEM UTILIZING A PCI BUS ARCHITECTURE

(75) Inventor: David R. Brown, Petaluma, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/499,504

(22) Filed: Feb. 7, 2000

(51) Int. Cl.$^7$ .......................... G06F 13/00; G06F 13/14; G06F 13/36
(52) U.S. Cl. ...................... 710/107; 710/305; 710/306; 710/110; 710/314
(58) Field of Search ................................ 710/107, 110, 710/305, 306, 314

(56) References Cited

U.S. PATENT DOCUMENTS

| 5,613,162 | A | * | 3/1997 | Kabenjian ..................... 710/22 |
| 5,884,052 | A | * | 3/1999 | Chambers et al. ........... 710/107 |
| 6,021,483 | A | * | 2/2000 | Adar et al. .................... 712/29 |
| 6,081,859 | A | * | 6/2000 | Munguia ....................... 710/107 |
| 6,262,976 | B1 | * | 7/2001 | McNamara ................... 370/254 |
| 6,282,598 | B1 | * | 8/2001 | Manabe ......................... 710/107 |
| 6,289,406 | B1 | * | 9/2001 | Chambers et al. ........... 710/107 |

OTHER PUBLICATIONS

"Structured Computer Organization", Andrew Tanenbaum, $3^{rd}$ edition, 1990.*

* cited by examiner

Primary Examiner—Sumati Lefkowitz
Assistant Examiner—Trisha Vu

(57) ABSTRACT

A mechanism for optimizing transaction retries within a system utilizing a peripheral component interconnect (PCI) bus architecture. Specifically, one embodiment of the present invention includes a system which optimizes transaction retries issued by a PCI bus master device to a target device coupled to a PCI bus. The system includes a target device communicatively coupled to a PCI bus and able to issue a retry signal over the PCI bus. Furthermore, the system includes a PCI bus master device communicatively coupled to the PCI bus and able to issue a transaction signal to the target device over the PCI bus. Moreover, the system includes a retry timer circuit coupled to the PCI bus master device in order to respond when the PCI bus master device receives the retry signal issued by the target device over the PCI bus. The retry timer circuit causes the PCI bus master device to wait a fixed period of time before reissuing the transaction signal to the target device over the PCI bus. The fixed period of time is regulated by the retry timer circuit and is hardwired into the retry timer circuit.

18 Claims, 11 Drawing Sheets

MECHANISM FOR OPTIMIZING TRANSACTION RETRIES WITHIN A SYSTEM UTILIZING A PCI BUS ARCHITECTURE

TECHNICAL FIELD

The present invention generally pertains to the field of the peripheral component interconnect (PCI) bus architecture. More particularly, the present invention relates to the field of transaction retries over a PCI bus.

BACKGROUND ART

Computers are useful functional devices which are fabricated in a variety of sizes ranging from computers which occupy large office space down to computers which are held in one's hand. These varying sizes of computers also perform an extremely wide variety of useful operations, depending on the software which is installed within their particular memory storage device. For example, computers can manage numerous financial transactions of a bank, control the fabrication of items ranging from automobiles down to integrated circuit chips, store addresses and telephone numbers of business and personal acquaintances, enable someone to produce and edit documents, along with transmitting and receiving data over a network such as the internet.

It should be appreciated that within a typical computer system there exists one or more bus architectures which are used to convey signals and information between distinct internal components of the computer system. For example, one or more bus architectures are typically used to connect a central processing unit (CPU) of the computer system to one or more of its memory storage devices. Additionally, the CPU is also usually connected to varying input/output components of the computer system by utilizing one or more different bus architectures. Therefore, when the computer system executes its programming, useful information and signals are able to be communicated between the CPU, memory storage devices, and diverse input/output components of the computer system.

In order to increase the functionality and usefulness of a computer system, varying peripheral devices are typically connected to it, such as a small computer systems interface (SCSI) host bus adapter, local area network (LAN) adapter, video adapter, graphics adapter, and the like. Additionally, these types of peripheral devices are also connected to the CPU, memory storage devices, and other components of the computer system by using one or more different bus architectures. It should be understood that over time the computer and electronics industry has developed several different types of bus architectures. One of the most widely used and widely supported bus architectures in the computer and electronics industry is the peripheral component interconnect bus architecture, commonly referred to as the PCI bus architecture. The PCI bus was developed in order to provide a high speed and low latency bus architecture from which a wide variety of systems can be developed. As part of the PCI bus architecture, a definitive set of rules and protocols were established for PCI agents connected to a PCI bus in order to standardize the manner of accessing, utilizing, and relinquishing the PCI bus. One of the purposes for the PCI standard is to maximize the data transfer bandwidth of the PCI bus. It should be appreciated that the set of rules and protocols of the PCI bus architecture are set forth in an industry standard PCI specification.

There are disadvantages associated with the PCI bus architecture. For instance, there are situations where the availability of the PCI bandwidth is substantially reduced, thereby limiting access to other requesting PCI bus master devices connected thereto. Specifically, one example of this occurs when a PCI bus master device issues a transaction to a target device over a PCI bus and the target device is currently unable to fulfill the requested transaction. As such, the target device issues a retry signal to the master device over the PCI bus. The receipt of the retry signal causes the master device to relinquish control of the PCI bus so it may be used by other PCI bus master devices. Under the rules of the PCI specification, the master device continues to reissue the transaction to the target device until the transaction is finally completed by the target device. As such, the master device typically arbitrates for and acquires the PCI bus as soon as possible in order to reissue the transaction to the target device for a second time. If the target device is still not ready to fulfill the requested transaction (which can often happen), the target device again issues a retry signal to the master device causing it to relinquish control of the PCI bus. This process continues until the transaction is eventually completed by the target device.

Given that the PCI specification dictates that only one transaction can take place over a PCI bus at any given time, the PCI bus is tied up by the PCI bus master device continually reissuing the transaction to the target device. Therefore, the availability of the PCI bandwidth is substantially reduced, thereby limiting access to other requesting PCI bus master devices connected thereto.

DISCLOSURE OF THE INVENTION

Accordingly, a need exists for a method and system for optimizing transaction signal retries between a PCI bus master device and a target device communicatively coupled by a PCI bus. The present invention provides a method and system which accomplishes this functionality along with other benefits.

Specifically, one embodiment of the present invention provides a system which optimizes transaction retries issued by a PCI bus master device to a target device coupled to a PCI bus. The system includes a target device communicatively coupled to a PCI bus and able to issue a retry signal over the PCI bus. Furthermore, the system includes a PCI bus master device communicatively coupled to the PCI bus and able to issue a transaction signal to the target device over the PCI bus. Additionally, the system includes a retry timer circuit coupled to the PCI bus master device in order to respond when the PCI bus master device receives the retry signal issued by the target device over the PCI bus. The retry timer circuit causes the PCI bus master device to wait a fixed period of time before reissuing the transaction signal to the target device over the PCI bus. The fixed period of time is regulated by the retry timer circuit and is hardwired into the retry timer circuit.

In another embodiment, the present invention provides a system which is similar to the previous embodiment. Specifically, the system of the present embodiment includes a retry timer circuit coupled to the PCI bus master device in order to respond when the PCI bus master device receives the retry signal issued by the target device over the PCI bus. The retry timer circuit causes the PCI bus master device to wait a delay value before reissuing the transaction signal to the target device over the PCI bus. The delay value is regulated by the retry timer circuit and is stored by the retry timer circuit. It should be appreciated that the delay value stored by the retry timer circuit can be changed by the PCI bus master device and/or by a remote device (e.g., CPU).

In still another embodiment, the present invention includes a system which dynamically optimizes transaction retries issued by a PCI bus master device to a target device coupled to a PCI bus. The system also includes a target device and a PCI bus master device communicatively coupled to a PCI bus. Additionally, the system includes a latency determination circuit coupled to the PCI bus master device and able to determine a delay value equivalent to how much time expires between the PCI bus master device receiving a first retry signal from the target device and the target device finally fulfilling this transaction issued by the PCI bus master device. Moreover, the system includes a retry timer circuit coupled to receive the delay value from the latency determination circuit. The retry timer circuit is able to respond when the PCI bus master device receives a second retry signal over the PCI bus corresponding to a second transaction issued by the PCI bus master device. The retry timer circuit is also able to cause the PCI bus master device to wait the delay value before reissuing the second transaction over the PCI bus. The delay value is regulated by the retry timer circuit. The latency determination circuit is able to increase or decrease the delay value stored within the retry timer circuit in order to optimizes transaction retries issued by the PCI bus master device.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
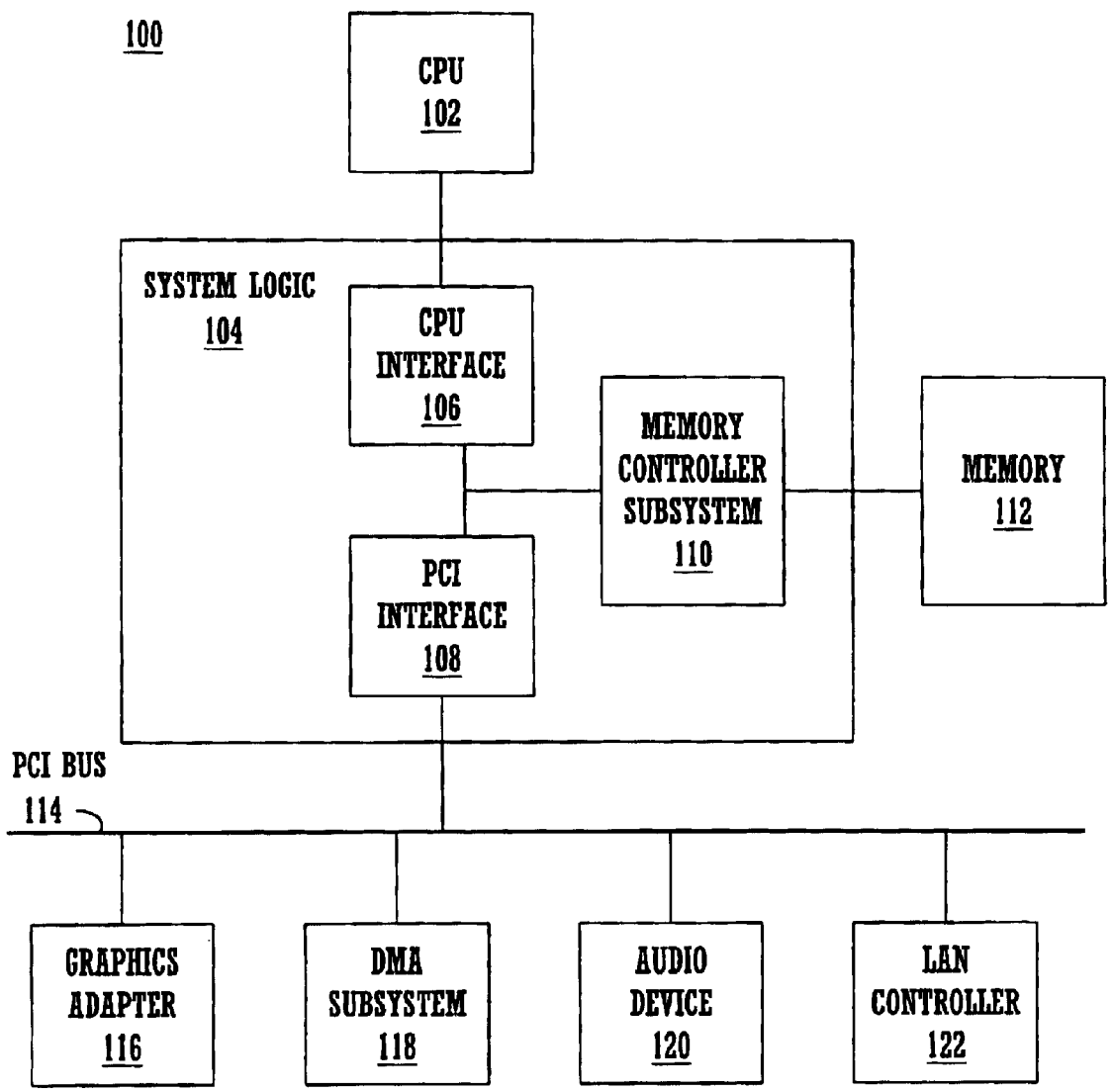
FIG. 1 is a block diagram of an exemplary computer system implemented with a PCI bus architecture in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "issuing", "generating", "receiving", "using", "transmitting", "reissuing", "responding", "causing", "fulfilling", "determining" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

The present invention provides a method and system for optimizing transaction signal retries between a peripheral component interconnect (PCI) bus master device and a target device communicatively coupled by a PCI bus. Specifically, one embodiment in accordance with the present invention is implemented within the PCI bus master device in order to control the frequency at which the PCI bus master device reissues a transaction signal to the target device over the PCI bus. As such, the present invention is able to minimize the number of unnecessary transaction signals reissued by the PCI bus master device to the target device over the PCI bus. Therefore, the present invention is able to optimize utilization of the PCI bus. Embodiments in accordance with the present invention and their benefits are discussed in greater detail below.

With reference now to FIG. 1, portions of the present method and system are comprised of computer-readable and computer-executable instructions which reside, for example, in computer-usable media of a computer system. FIG. 1 is a block diagram of an exemplary computer system 100 implemented with a PCI bus architecture in accordance with one embodiment of the present invention. It is appreciated that system 100 of FIG. 1 is only exemplary and that the present invention can operate within a number of different computer systems utilizing the PCI bus architecture including general purpose networked computer systems, embedded computer systems, stand alone computer systems, and the like.

System 100 of FIG. 1 includes a central processor unit (CPU) 102, which may be an 80×86-family microprocessor or any other type of processor. Central processor unit 102 is coupled to a System Logic chip 104, which can be implemented in a wide variety of ways. System Logic chip 104 includes a CPU interface 106, a memory controller subsystem 110, and a PCI interface 108 which are all communicatively coupled together. As such, central processor unit 102 and a memory unit 112 are able to communicate via CPU interface 106 and memory controller subsystem 110. Additionally, central processor unit 102 and each PCI device coupled to PCI bus 114 are able to communicate via CPU interface 106 and PCI interface 108. It should be appreciated that the functionality of a System Logic chip is well known by those of ordinary skill in the art. As previously mentioned, system 100 includes memory unit 112 which is utilized for storing information and instructions for central processor unit 102. Furthermore, it is understood that memory unit 112 may be different types of memory. For example, memory unit 112 may be computer usable volatile memory (e.g., random access memory, static RAM, dynamic RAM, etc.) or it may be computer usable non-volatile memory (e.g., read only memory, programmable ROM, flash memory, EPROM, EEPROM, etc.).

System 100 includes a PCI bus 114 which is coupled to several PCI devices (e.g., 116–122) and also to PCI interface 108 of System Logic chip 104. Specifically, the PCI devices coupled to PCI bus 114 include a graphics adapter 116, a direct memory access (DMA) subsystem 118, an audio device 120, and a local area network (LAN) controller 122. It should be appreciated that one embodiment in accordance with the present invention may be implemented as part of PCI devices 116–122. Additionally, one embodiment in accordance with the present invention may be implemented as part of many different PCI bus master devices. Within system 1100, PCI devices 116–122 each uses PCI bus 114 in order to transmit and receive information and data. Furthermore, PCI bus 114 comprises a variety of functional signal lines such as error signal lines, interface control lines, address/data lines, and the like. As such, each PCI bus device is coupled to the functional signal lines of PCI bus 114. It is understood that when any one of PCI devices 116–122 desires use of PCI bus 114 in order to transmit data, it requests ownership of PCI bus 114 from a PCI arbiter (not shown) commonly located within PCI interface 108. The PCI device requesting ownership of PCI bus 114 is commonly referred to as a bus master or initiator. Once granted ownership of PCI bus 114 from the PCI arbiter, the PCI bus master carries out its data transfer over PCI bus 114.

With reference still to FIG. 1, it is also understood that each of PCI devices 116–122 may independently request ownership of PCI bus 114. As such, at any given time several of PCI devices 116–122 may simultaneously request ownership of PCI bus 114. When simultaneous requests for ownership of PCI bus 114 occur, the PCI arbiter arbitrates between different requesting PCI devices in order to determine which PCI device is granted ownership of PCI bus 114. Once granted ownership of PCI bus 114, the PCI bus master device (e.g., LAN controller 122) initiates its transaction by issuing a transaction signal to a target device (e.g., memory unit 112) over PCI bus 114. When the requested transaction has been completed by the target device, the PCI bus master device relinquishes ownership of PCI bus 114 thereby allowing the PCI arbiter to grant ownership of PCI bus 114 to another requesting PCI device. It should be appreciated that the protocols and rules of the PCI bus architecture are well known by those of ordinary skill in the art.

Figure 2A:
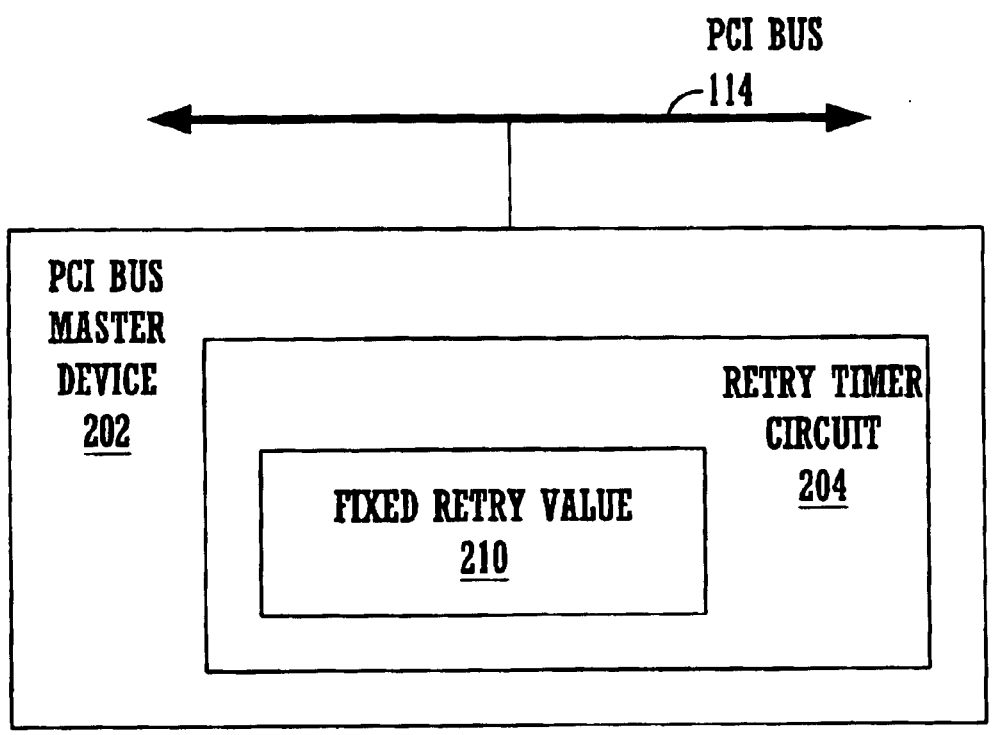
FIG. 2A is a block diagram of an exemplary PCI bus master device implemented with a retry timer circuit having a fixed retry value in accordance with one embodiment of the present invention.

Referring now to FIG. 2A, which is a block diagram of an exemplary PCI bus master device 202 implemented with a retry timer circuit 204 having a fixed retry value 210 in accordance with one embodiment of the present invention. The retry timer circuit 204 of the present embodiment is implemented as part of PCI bus master device 202 in order to control the frequency at which PCI bus master device 202 reissues a transaction signal to a target device over PCI bus 114. It should be understood that PCI bus master device 202 represents an exemplary PCI bus master device such as graphics adapter 116, DMA subsystem 118, audio device 120, and LAN controller 122 as mentioned above with reference to FIG. 1. As shown in FIG. 2A, PCI bus master device 202 is coupled to PCI bus 114 in order to transmit and receive data from a target device coupled to PCI bus 114.

As previously mentioned, one of the main functions of retry timer circuit 204 of the present embodiment is to control the frequency at which PCI bus master device 202 reissues a transaction signal to a target device over PCI bus 114. In order to more fully understand the functionality of retry timer circuit 204, an example is described below. Before issuing a transaction signal to a target device over PCI bus 114, PCI bus master device 202 first requests ownership of PCI bus 114 from the PCI arbiter located within PCI interface 108. Once granted ownership of PCI bus 114, PCI bus master device 202 issues a transaction signal over PCI bus 114 identifying the specific target device (e.g., memory unit 112, selected by a memory address) along with the type of transaction (e.g., memory read) desired . If the target device is unable to fulfill the requested transaction, it issues a retry signal to PCI bus master device 202 over PCI bus 114. The reception of the retry signal causes PCI bus master device 202 to relinquish control of PCI bus 114 for use by other PCI bus master devices. Additionally, the reception of the retry signal by PCI bus master device 202 also triggers retry timer circuit 204 into operation. Specifically, retry timer circuit 204 causes PCI bus master device 202 to wait a fixed period of time (e.g., 1 microsecond) before reissuing the transaction signal to the target device. The fixed period of time (delay value) that retry timer circuit 204 causes PCI bus master device 202 to wait is hardwired into its circuitry as fixed retry value 210.

Within the present embodiment of FIG. 2A, one of the reasons retry timer circuit 204 causes PCI bus master device 202 to wait the fixed period of time before reissuing the transaction signal to the target device is to allow the target device enough time to perform internal operations necessary to complete the pending PCI transaction. As such, PCI bus master device 202 does not repeatedly reissue the same transaction to the target device which is currently unable to fulfill the requested transaction. It is appreciated that once the fixed period of time established by fixed retry value 210 has expired, PCI bus master device 202 arbitrates for and acquires PCI bus 114 in order to reissue the transaction signal to the target device. If the target device is still unable to fulfill the requested transaction, the process described above is repeated until the requested transaction is completed.

As previously mentioned, the fixed period of time (delay value) that retry timer circuit 204 causes PCI bus master device 202 to wait before reissuing the transaction signal is hardwired into its circuitry as fixed retry value 210. Additionally, fixed retry value 210 (delay value) hardwired into retry timer circuit 204 can represent any specific interval of time. Moreover, fixed retry value 210 hardwired into retry timer circuit 204 may represent a particular number of PCI clock cycles or some other time base unrelated to PCI clock cycles.

It should be appreciated that fixed retry value 210 (delay value) hardwired into retry timer circuit 204 can be different depending on the type of computer system PCI bus master device 202 is coupled to. For example, if computer system 100 is a networking server computer utilizing a networking operating system (e.g., Novell Netware, Microsoft Windows NT, etc.), the fixed retry value 210 hardwired into retry timer circuit 204 may be different than if computer system 100 is a stand alone computer utilizing a desktop operating system (e.g., DOS driver, Microsoft Windows 98, etc.).

Referring still to FIG. 2A, it should be understood that retry timer circuit 204 of the present embodiment can be implemented in such a manner that it responds to any retry signal received by PCI bus master device 202. Furthermore, retry timer circuit 204 can be implemented such that it only responds to retry signals corresponding to a particular type of transaction signal (e.g., memory read, memory write, etc.) initially issued by PCI bus master device 202. The retry timer circuit 204 can also be implemented such that it only responds to retry signals corresponding to transaction signals initially issued to a particular target device (e.g., memory unit 112) by PCI bus master device 202. Moreover, retry timer circuit 204 can be implemented such that it only responds to retry signals corresponding to transaction signals initially issued over a particular DMA channel supported by PCI bus master device 202.

Figure 2B:
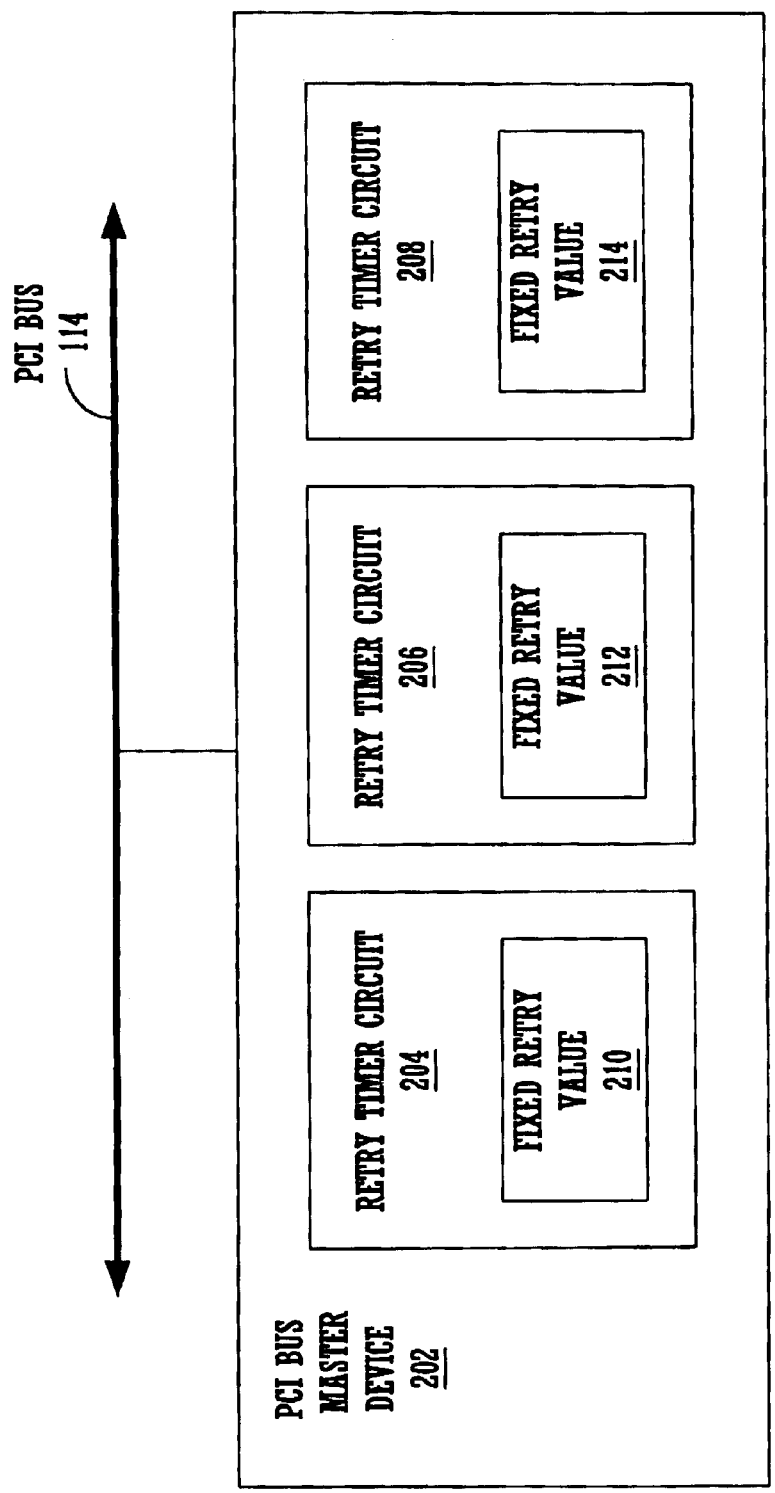
FIG. 2B is a block diagram of an exemplary PCI bus master device implemented with multiple retry timer circuits having fixed retry values in accordance with one embodiment of the present invention.

Referring to FIG. 2B, which is a block diagram of exemplary PCI bus master device 202 implemented with multiple retry timer circuits 204–208 having fixed retry values 210–214 in accordance with one embodiment of the present invention. It should be appreciated that retry timer circuits 206 and 208 operate in a manner similar to retry timer circuit 204 described above. Additionally, fixed retry values 212 and 214 operate in a manner similar to fixed retry value 210 described above. Furthermore, retry timer circuits 206 and 208 of the present embodiment may be implemented in all of the different ways that retry timer circuit 204 may be implemented, as described above. Moreover, fixed retry values 212 and 214 of the present embodiment may be implemented in all of the different ways that fixed retry value 210 may be implemented, as described above. The retry timer circuits 204–208 of the present embodiment are implemented as part of PCI bus master device 202 in order to control the frequency at which PCI bus master device 202 reissues a transaction signal to a target device over PCI bus 114. Specifically, each one of retry timer circuits 204–208 can be implemented differently such that it specifically responds to retry signals corresponding to a particular element or particular elements of transactions issued by PCI bus master device 202.

For example, retry timer circuit 204 can be implemented to only respond to retry signals corresponding to memory read transaction signals initially issued by PCI bus master device 202 while retry timer circuit 206 can be implemented to only respond to retry signals corresponding to memory write transaction signals while retry timer circuit 208 can be implemented to only respond to retry signals corresponding to memory write invalidate transaction signals. Another example would be implementing retry timer circuits 204–208 such that each one responds to a different DMA channel supported by PCI bus master device 202.

With reference still to FIG. 2B, it is appreciated that each one of fixed retry values 210–214 can be implemented with a different fixed period of time (delay value). As such, the amount of time PCI bus master device 202 waits before reissuing a transaction signal can be specifically tailored to the different transactions supported by PCI bus master device 202. It should be understood that PCI bus master device 202 of the present embodiment is well suited to be implemented with any number of retry timer circuits having fixed retry values similar to retry timer circuit 204 and fixed retry value 210.

Figure 3A:
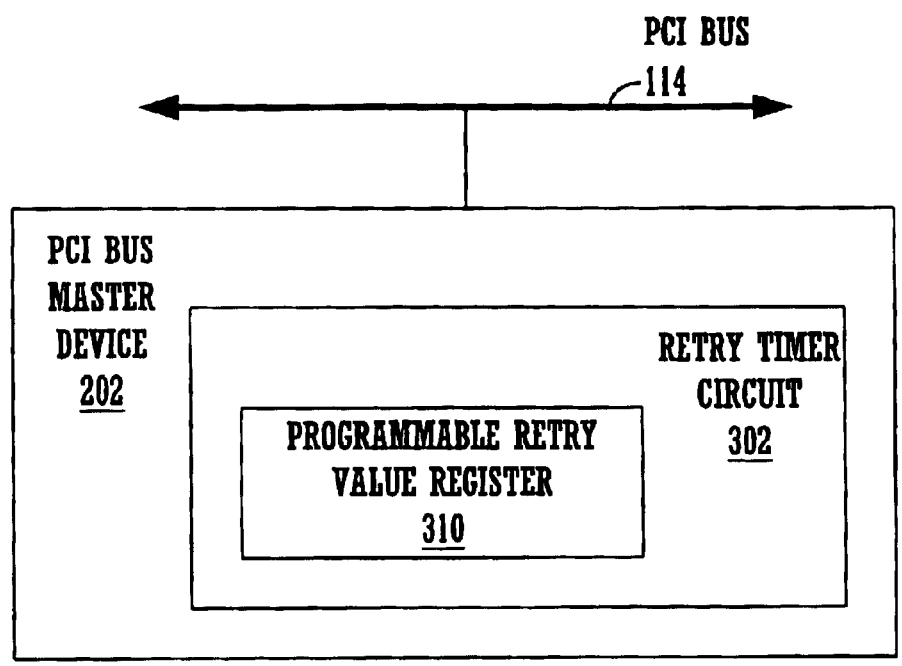
FIG. 3A is a block diagram of an exemplary PCI bus master device implemented with a retry timer circuit having a programmable retry value register in accordance with one embodiment of the present invention.

With reference now to FIG. 3A, which is a block diagram of exemplary PCI bus master device 202 implemented with a retry timer circuit 302 having a programmable retry value register 310 in accordance with one embodiment of the present invention. The retry timer circuit 302 of the present embodiment is implemented as part of PCI bus master device 202 in order to control the frequency at which PCI bus master device 202 reissues a transaction signal to a target device over PCI bus 114. In the present embodiment, retry timer circuit 302 causes PCI bus master device 202 to wait a variable, programmable amount of time before reissuing the transaction signal. This variable amount of time is determined by the contents of programmable retry value register 310.

One of the reasons retry timer circuit 302 and programmable retry value register 310 cause PCI bus master device 202 to wait a period of time before reissuing the transaction signal to the target device is to allow the target device enough time to perform internal operations necessary to be able to complete the pending PCI transaction. As such, PCI bus master device 202 does not repeatedly reissue the same transaction to the target device which is currently unable to fulfill the requested transaction. It should be appreciated that once the period of time (delay value) stored within programmable retry value register 310 has expired, PCI bus master device 202 arbitrates for and acquires PCI bus 114 in order to reissue the transaction signal to the target device. If the target device is still unable to fulfill the requested transaction, the process described above is repeated until the requested transaction is completed.

As previously mentioned, the period of time that retry timer circuit 302 causes PCI bus master device 202 to wait before reissuing a transaction signal is dependent on the delay value stored within programmable retry value register 310. Furthermore, the delay value stored within programmable retry value register 310 of the present embodiment is changeable and can be any value. For example, the delay value stored within programmable retry value register 310 can be remotely changed by another device (e.g., central processor unit 102) coupled to PCI bus 114. Furthermore, the delay value stored within programmable retry value register 310 can be changed by hardware and/or software associated with PCI bus master device 202. It should be understood that the delay value stored within programmable retry value register 310 of the present embodiment can represent any specific interval of time. That is, the value stored within programmable retry value register 310 may represent a particular number of PCI clock cycles or some other time base unrelated to PCI clock cycles.

It should be appreciated that the delay value stored within programmable retry value register 310 can be different depending on the type of computer system PCI bus master device 202 is coupled to. For example, if computer system 100 is a networking server computer utilizing a networking operating system (e.g., Novell Netware, Microsoft Windows NT, etc.), the stored value within programmable retry value register 310 may be different than if computer system 100 is a stand alone computer utilizing a desktop operating system (e.g., DOS driver, Microsoft Windows 98, etc.).

Still referring to FIG. 3A, it should be understood that retry timer circuit 302 of the present embodiment may be implemented in all of the different ways that retry timer circuit 204 may be implemented, as described above with reference to FIG. 2A.

Figure 3B:
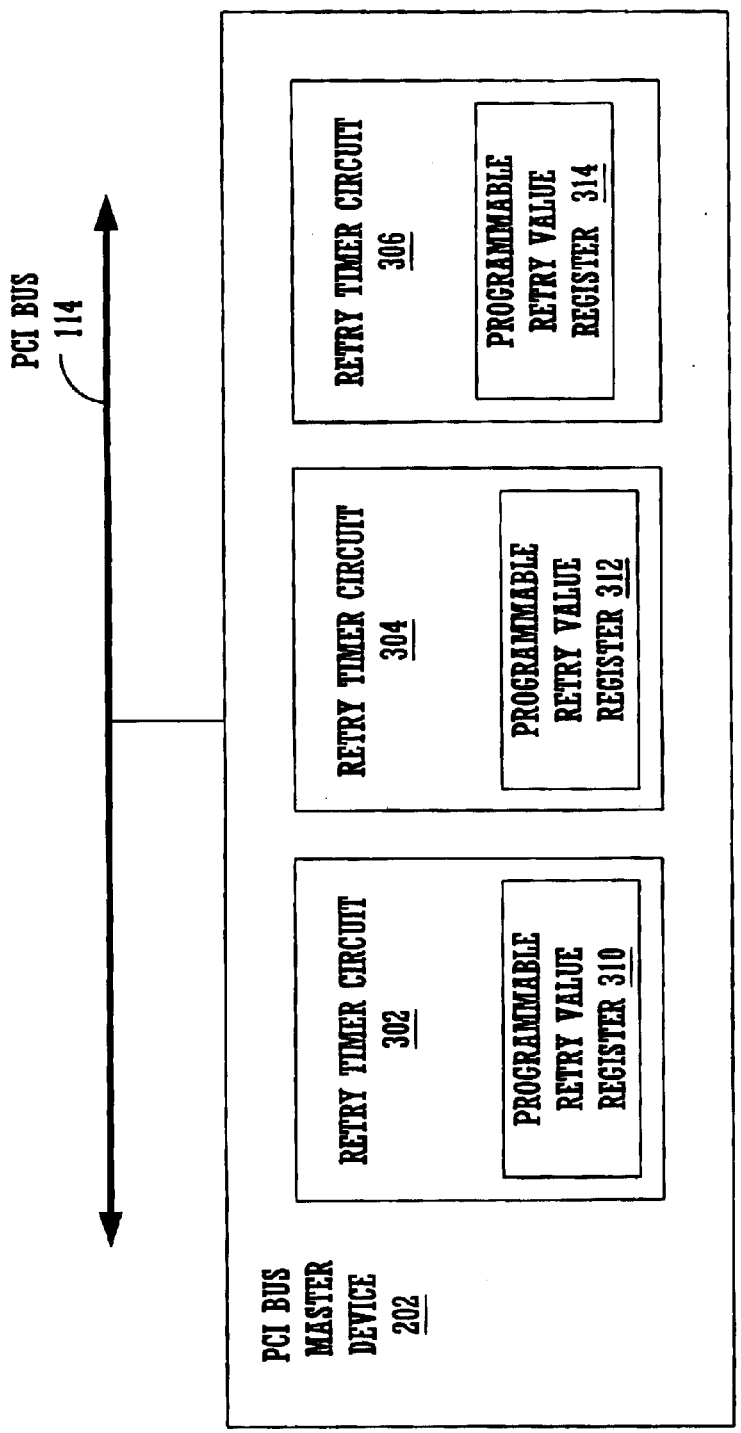
FIG. 3B is a block diagram of an exemplary PCI bus master device implemented with multiple retry timer circuits having programmable retry value registers in accordance with one embodiment of the present invention.

With reference now to FIG. 3B, which is a block diagram of exemplary PCI bus master device 202 implemented with multiple retry timer circuits 302–306 having programmable retry value registers 310–314 in accordance with one embodiment of the present invention. It should be appreciated that retry timer circuits 304 and 306 operate in a manner similar to retry timer circuit 302 described above. Additionally, programmable retry value registers 312 and 314 operate in a manner similar to programmable retry value register 310 described above. Moreover, retry timer circuits 304 and 306 of the present embodiment may be implemented in all of the different ways that retry timer circuit 302 may be implemented, as described above. Furthermore, programmable retry value registers 312 and 314 of the present embodiment may be implemented in all of the different ways that programmable retry value register 310 may be implemented, as described above. The retry timer circuits 302–306 of the present embodiment are implemented as part of PCI bus master device 202 in order to control the frequency at which PCI bus master device 202 reissues a transaction signal to a target device over PCI bus 114. Specifically, each one of retry timer circuits 302–306 can be implemented differently such that it specifically responds to retry signals corresponding to a particular element or particular elements of transactions issued by PCI bus master device 202.

For example, retry timer circuit 302 can be implemented to only respond to retry signals corresponding to memory read transaction signals initially issued by PCI bus master device 202 while retry timer circuit 304 can be implemented to only respond to retry signals corresponding to memory write transaction signals while retry timer circuit 306 can be implemented to only respond to retry signals corresponding to memory write invalidate transaction signals. Another example would be implementing retry timer circuits 302–306 such that each one responds to a different DMA channel supported by PCI bus master device 202.

It is appreciated that each one of programmable retry value registers 310–314 of FIG. 3B can store a different period of time (delay value). As such, the amount of time PCI bus master device 202 waits before reissuing a transaction signal can be specifically tailored to the different transactions supported by PCI bus master device 202. It should be understood that PCI bus master device 202 of the present embodiment is well suited to be implemented with any number of retry timer circuits and programmable retry value registers similar to retry timer circuit 302 and programmable retry value register 310.

Figure 4A:
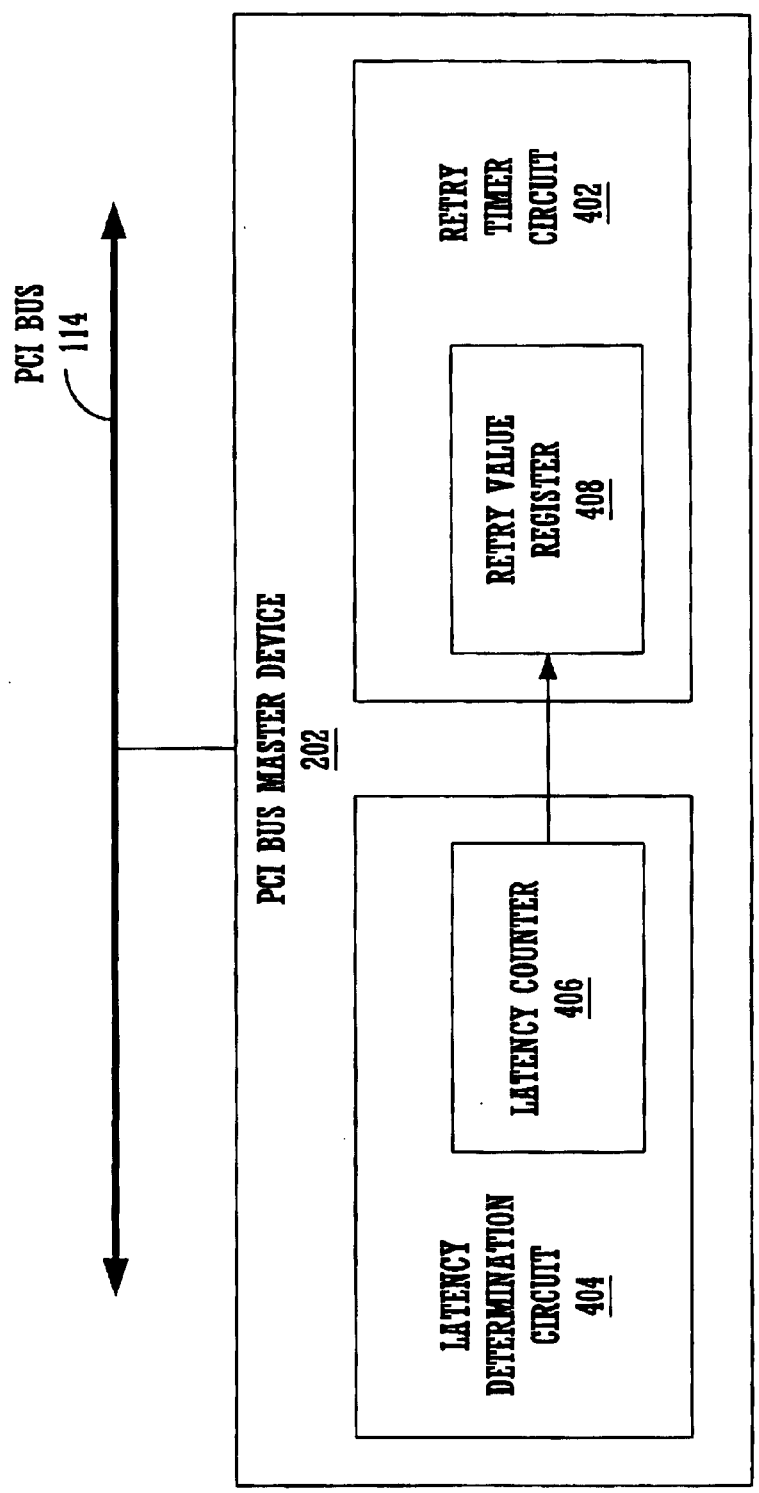
FIG. 4A is a block diagram of an exemplary PCI bus master device implemented with a retry timer circuit and a latency determination circuit in accordance with one embodiment of the present invention.

Referring now to FIG. 4A, which is a block diagram of an exemplary PCI bus master device 202 implemented with a retry timer circuit 402 and a latency determination circuit 404 in accordance with one embodiment of the present invention. The retry timer circuit 402 and latency determination circuit 404 of the present embodiment are implemented as part of PCI bus master device 202 in order to dynamically control the frequency at which PCI bus master device 202 reissues a transaction signal to a target device over PCI bus 114. Within the present embodiment, one of the main functions of latency determination circuit 404 is to determine a delay value to be stored within retry value register 408 of retry timer circuit 402. Furthermore, retry timer circuit 402 causes PCI bus master device 202 to wait a variable amount of time before reissuing the transaction signal. This variable amount of time is determined by the delay value stored within retry value register 408. It should be understood that the delay value stored within retry value register 408 can be dynamically varied by latency determination circuit 404. As such, PCI bus master device 202 is able to react to changing conditions of system 100 and thereby reissue transaction signals more efficiently. In order to more fully understand the functionality of latency determination circuit 404 and retry timer circuit 402, an example is described below.

Within the present embodiment, latency determination circuit 404 first determines a delay value which is subsequently stored within retry value register 408 of retry timer circuit 402. Specifically, latency determination circuit 404 and latency counter 406 of the present embodiment measure how much time expires between the reception of a first retry signal by PCI bus master device 202 and when the target device finally fulfills the desired transaction. For example, once granted ownership of PCI bus 114, PCI bus master device 202 issues a transaction signal over PCI bus 114 identifying the specific target device (e.g., memory unit 112) along with the desired type of transaction (e.g., memory read). If the target device is unable to fulfill the requested transaction, it issues a retry signal to PCI bus master device 202 over PCI bus 114. The reception of the retry signal causes PCI bus master device 202 to relinquish control of PCI bus 114 and also triggers latency counter 406 to be reset and start incrementing. PCI bus master device 202 of the present embodiment continues to reissue the transaction signal to the target device as quickly as possible until the transaction is finally fulfilled by the target device. At completion, latency counter 406 stops incrementing and its current value is subsequently stored within retry value register 408 of retry timer circuit 402. In this manner, latency determination circuit 404 and latency counter 406 of the present embodiment determine a delay value to be stored within retry value register 408.

Referring still to FIG. 4A, it should be appreciated that the period of time that retry timer circuit 402 causes PCI bus master device 202 to wait before reissuing a transaction signal is dependent on the delay value stored within retry value register 408. In other words, during subsequently issued transactions of PCI bus master device 202, the delay value stored within retry value register 408 controls how long retry timer circuit 402 causes PCI bus master device 202 to wait before reissuing a transaction to a target device. One of the main reasons retry timer circuit 402 and retry value register 408 cause PCI bus master device 202 to wait a period of time before reissuing a transaction signal to a busy target device is to allow the target device enough time to perform internal operations necessary to complete the pending PCI transaction. It should be understood that retry timer circuit 402 and retry value register 408 operate in a manner similar to retry timer circuit 302 and programmable retry value register 310 described above with reference to FIGS. 3A and 3B.

Within the present embodiment, the delay value stored within retry value register 408 of retry timer circuit 402 can be dynamically varied in order to cause PCI bus master device 202 to reissue transaction signals more efficiently. For example, the value stored within retry value register 408 can be reset to zero after a predefined amount of time (e.g., 1 second, 5 seconds, etc.) has expired. In that event, latency determination circuit 404 and latency counter 406 determine a new delay value to store within retry value register 408 by repeating the process described above. It is appreciated that there is a possibility that the determined new value could be exactly the same as the previous delay value stored within retry value register 408.

Referring still to FIG. 4A, the delay value stored within retry value register 408 of retry timer circuit 402 can be decreased by latency determination circuit 404 after a predefined amount of time (e.g., 1 second, 10 seconds, etc.) has expired. Additional complexity can be added to the present embodiment. For example, if PCI bus master device 202 subsequently experiences more retry signals because of the decrease in the delay value stored within retry value register 408, latency determination circuit 404 can increase the value or return it to its original value. Conversely, if PCI bus master device 202 subsequently experiences less retry signals because of the decrease in the delay value stored within retry value register 408, latency determination circuit 404 can further decrease the value.

Within the present embodiment, if the delay value stored within retry value register 408 of retry timer circuit 402 is successfully used a predefined amount of times (e.g., 3, 5, 10, etc.), the delay value can be decreased by latency determination circuit 404. However, if PCI bus master device 202 subsequently experiences more retry signals because of the decrease in the value stored within retry value register 408, latency determination circuit 404 can increase the delay value or return it to its original value. Furthermore, if the delay value stored within retry value register 408 is used unsuccessfully a predefined amount of times (e.g., 3, 5, 10, etc.), the delay value can be increased by latency determination circuit 404.

With reference still to FIG. 4A, retry timer circuit 402 and latency determination circuit 404 of the present embodiment are implemented with hardware and/or software. As previously mentioned, the period of time that retry timer circuit 402 causes PCI bus master device 202 to wait before reissuing a transaction signal is dependent on the delay value stored within retry value register 408. Furthermore, the delay value stored within retry value register 408 of the present embodiment is changeable and can be any value as described above. Additionally, the value stored within retry value register 408 may be remotely changed by another device (e.g., central processor unit 102) coupled to PCI bus 114. It should be understood that the delay value stored within retry value register 408 of the present embodiment can represent any specific interval of time. In other words, the delay value stored within retry value register 408 may represent a particular number of PCI clock cycles or some other time base unrelated to PCI clock cycles.

Referring still to FIG. 4A, it should be appreciated that retry timer circuit 402 of the present embodiment may be implemented in all of the different ways that retry timer circuit 204 may be implemented, as described above with reference to FIG. 2A.

Figure 4B:
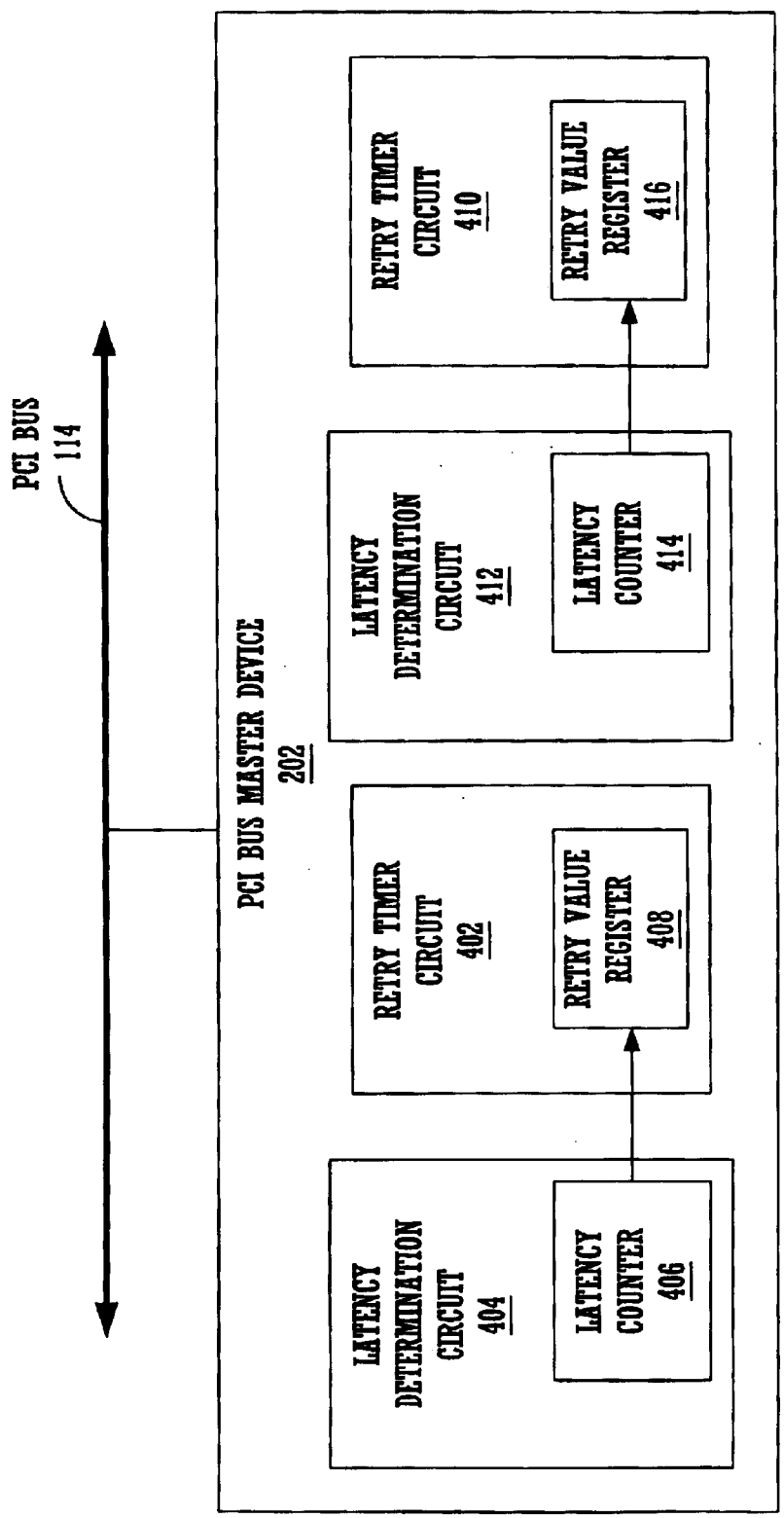
FIG. 4B is a block diagram of an exemplary PCI bus master device implemented with multiple retry timer circuits and latency determination circuits in accordance with one embodiment of the present invention.

Referring now to FIG. 4B, which is a block diagram of exemplary PCI bus master device 202 implemented with multiple retry timer circuits 402 and 410 along with multiple latency determination circuits 404 and 412 in accordance with one embodiment of the present invention. It should be appreciated that retry timer circuit 410 and retry value register 416 operate in a similar manner as retry timer circuit 402 and retry value register 408 described above. Furthermore, latency determination circuit 412 and latency counter 414 operate in a similar manner as latency determination circuit 404 and latency counter 406 described above. Moreover, retry timer circuit 410, retry value register 416, latency determination circuit 412, and latency counter 414 of the present embodiment may be implemented in all of the different ways that retry timer circuit 402, retry value register 408, latency determination circuit 404, and latency counter 406 may be implemented, as described above. The retry timer circuits 402 and 410 together with latency determination circuits 404 and 412 of the present embodiment are implemented as part of PCI bus master device 202 in order to dynamically control the frequency at which PCI bus master device 202 reissues a transaction signal to a target device over PCI bus 114. Specifically, retry timer circuit 402 and latency determination circuit 404 can be implemented differently than retry timer circuit 410 and latency determination circuit 412 such that each specifically responds to retry signals corresponding to a particular element or particular elements of transactions issued by PCI bus master device 202.

For example, retry timer circuit 402 and latency determination circuit 404 can be implemented to only respond to retry signals corresponding to memory read transaction signals initially issued by PCI bus master device 202 while retry timer circuit 410 and latency determination circuit 412 can be implemented to only respond to retry signals corresponding to memory write transaction signals. Another example would be implementing retry timer circuit 402 and latency determination circuit 404 such that they respond to one or more DMA channels supported by PCI bus master device 202 while retry timer circuit 410 and latency determination circuit 412 are implemented to respond to different DMA channels supported by PCI bus master device 202.

With reference still to FIG. 4B, it is appreciated that each one of retry value registers 408 and 416 can store a different period of time (delay value). As such, the amount of time PCI bus master device 202 waits before reissuing a transaction signal can be specifically tailored to the different transactions supported by PCI bus master device 202. It should be understood that PCI bus master device 202 of the present embodiment is well suited to be implemented with any number of retry timer circuits and latency determination circuits similar to retry timer circuit 402 and latency determination circuit 404.

Figure 5:
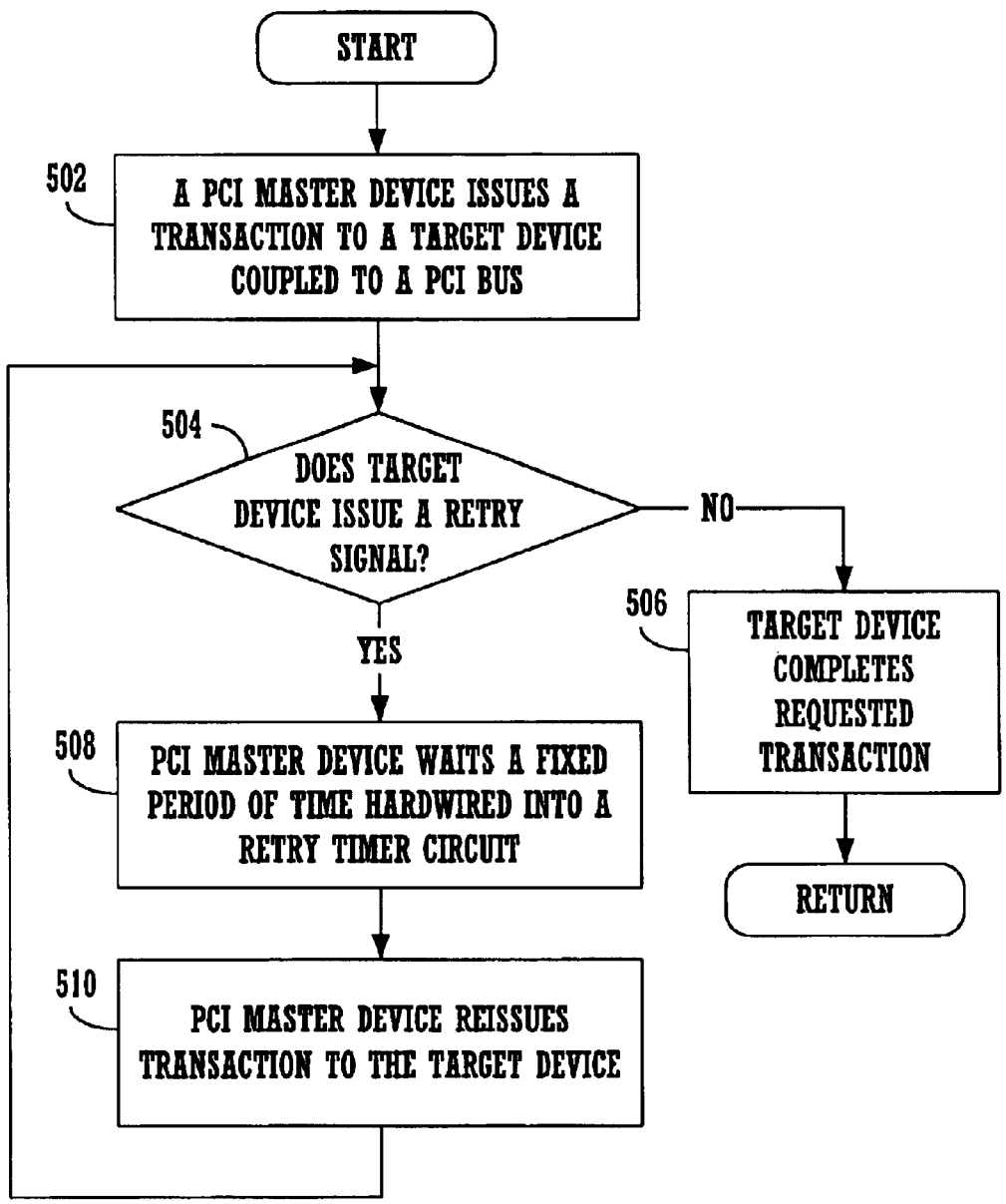
FIG. 5 is a flowchart of steps performed in accordance with one embodiment of the present invention for causing a PCI bus master device to wait a fixed period of time before reissuing a transaction to a target device.

With reference now to FIG. 5, a flowchart 500 of steps performed in accordance with one embodiment of the present invention for causing a PCI bus master device to wait a fixed period of time before reissuing a transaction to a target device. Although specific steps are disclosed in flowchart 500 of FIG. 5, such steps are exemplary. That is, the present invention is well suited to performing various other steps or variations of the steps recited in FIG. 5.

At step 502, within the present embodiment, a PCI bus master device (e.g., 202) issues a transaction signal (e.g., memory read) to a target device (e.g., memory unit 112) over a PCI bus (e.g., 114). It is understood that the PCI bus master device and target device are coupled to the PCI bus. Furthermore, it is appreciated that as part of step 502, the PCI bus master device arbitrates for and is granted ownership of the PCI bus in order to issue the transaction signal.

In step 504 of FIG. 5, the present embodiment determines whether the target device issued a retry signal to the PCI bus master device. If the present embodiment determines that the target device did not issue a retry signal to the PCI bus master device at step 504, the present embodiment proceeds to step 506. However, if the present embodiment determines that the target device issued a retry signal to the PCI bus master device at step 504, the present embodiment proceeds to step 508.

At step 508, once the PCI bus master device receives the retry signal issued by the target device, a retry timer circuit (e.g., 204 of FIG. 2A) coupled to the PCI bus master device causes it to wait a fixed period of time (delay value) before reissuing the transaction signal. It should be appreciated that the fixed period of time that the retry timer circuit causes the PCI bus master device to wait is hardwired into the retry timer circuit. It is understood that upon reception of the retry signal, the PCI bus master device relinquishes ownership of the PCI bus.

In step 510, upon the expiration of the fixed period of time (delay value) controlled by the retry timer circuit, the PCI bus master device reissues the transaction to the target device. It is appreciated that as part of step 510, the PCI bus master device arbitrates for and is granted ownership of the PCI bus in order to reissue the transaction signal. At the completion of step 510, the present embodiment proceeds to the beginning of step 504.

At step 506 of FIG. 5, since the target device has accepted the transaction signal, it completes the requested transaction issued by the PCI bus master device. Upon completion of step 506, the PCI bus master device relinquishes ownership of the PCI bus and the present embodiment of flowchart 500 is exited.

Figure 6:
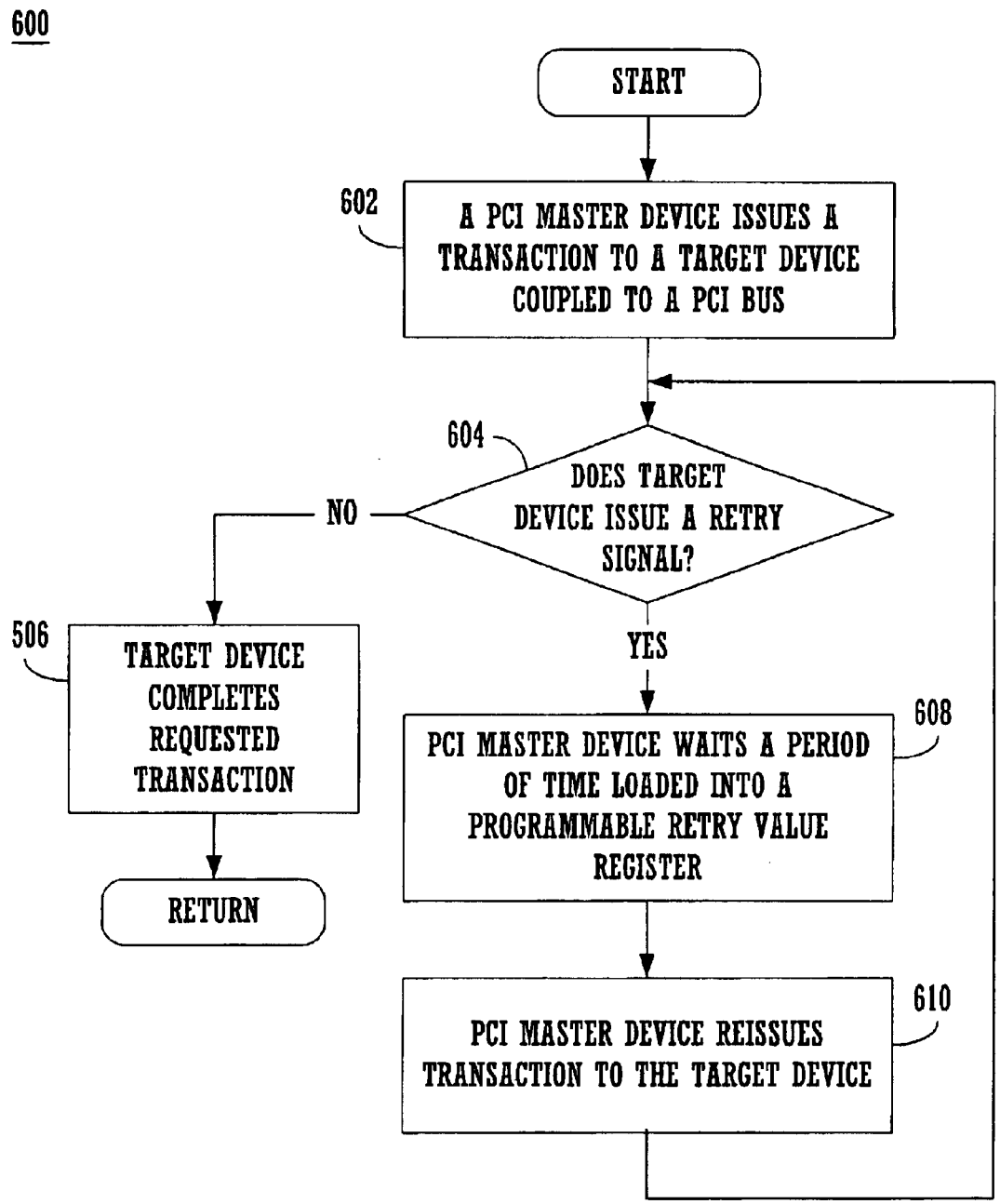
FIG. 6 is a flowchart of steps performed in accordance with one embodiment of the present invention for causing a PCI bus master device to wait a programmable period of time before reissuing a transaction to a target device.

Referring now to FIG. 6, which is a flowchart 600 of steps performed in accordance with one embodiment of the present invention for causing a PCI bus master device to wait a programmable period of time before reissuing a transaction to a target device. Although specific steps are disclosed in flowchart 600 of FIG. 6, such steps are exemplary. That is, the present invention is well suited to performing various other steps or variations of the steps recited in FIG. 6.

At step 602, within the present embodiment, a PCI bus master device (e.g., 202) issues a transaction signal (e.g., memory read) to a target device (e.g., memory unit 112) over a PCI bus (e.g., 114). It is appreciated that the PCI bus master device and target device are coupled to the PCI bus. Furthermore, it is understood that as part of step 602, the PCI bus master device arbitrates for and is granted ownership of the PCI bus in order to issue the transaction signal.

In step 604 of FIG. 6, the present embodiment determines whether the target device issued a retry signal to the PCI bus master device. At step 604, if the present embodiment determines that the target device did not issue a retry signal to the PCI bus master device, the present embodiment proceeds to step 606. However, if the present embodiment determines that the target device issued a retry signal to the PCI bus master device at step 604, the present embodiment proceeds to step 608.

At step 608, once the PCI bus master device receives the retry signal issued by the target device, a retry timer circuit (e.g., 302 of FIG. 3A) which includes a programmable retry value register (e.g., 310) are coupled to the PCI bus master device and cause it to wait a specified period of time (delay value) before reissuing the transaction signal. It should be understood that the specified period of time (delay value) that the retry timer circuit and programmable retry value register cause the PCI bus master device to wait is loaded into and stored by the programmable retry value register. It is appreciated that upon reception of the retry signal, the PCI bus master device relinquishes ownership of the PCI bus.

In step 610 of FIG. 6, upon the expiration of the period of time (delay value) controlled by the programmable retry value register, the retry timer circuit allows the PCI bus master device to reissue the transaction to the target device. It is appreciated that as part of step 610, the PCI bus master device arbitrates for and is granted ownership of the PCI bus in order to reissue the transaction signal. At the completion of step 610, the present embodiment proceeds to the beginning of step 604.

At step 606, since the target device has accepted the transaction signal, it completes the requested transaction issued by the PCI bus master device. Upon completion of step 606, the PCI bus master device relinquishes ownership of the PCI bus and the present embodiment of flowchart 600 is exited.

Figure 7A:
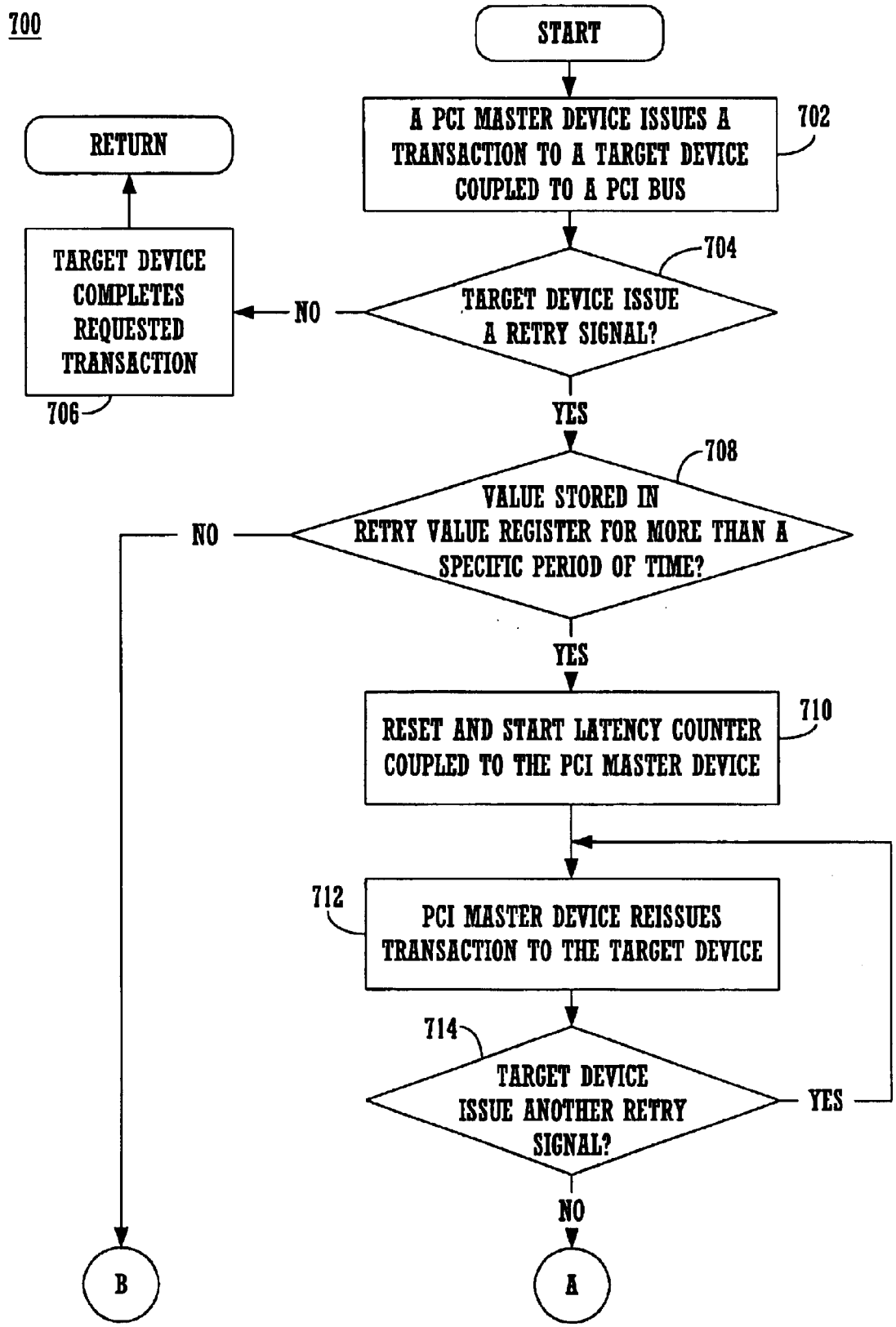
FIGS. 7A and 7B are a flowchart of steps performed in accordance with one embodiment of the present invention for dynamically adjusting the period of time that a PCI bus master device waits before reissuing a transaction to a target device.
Figure 7B:
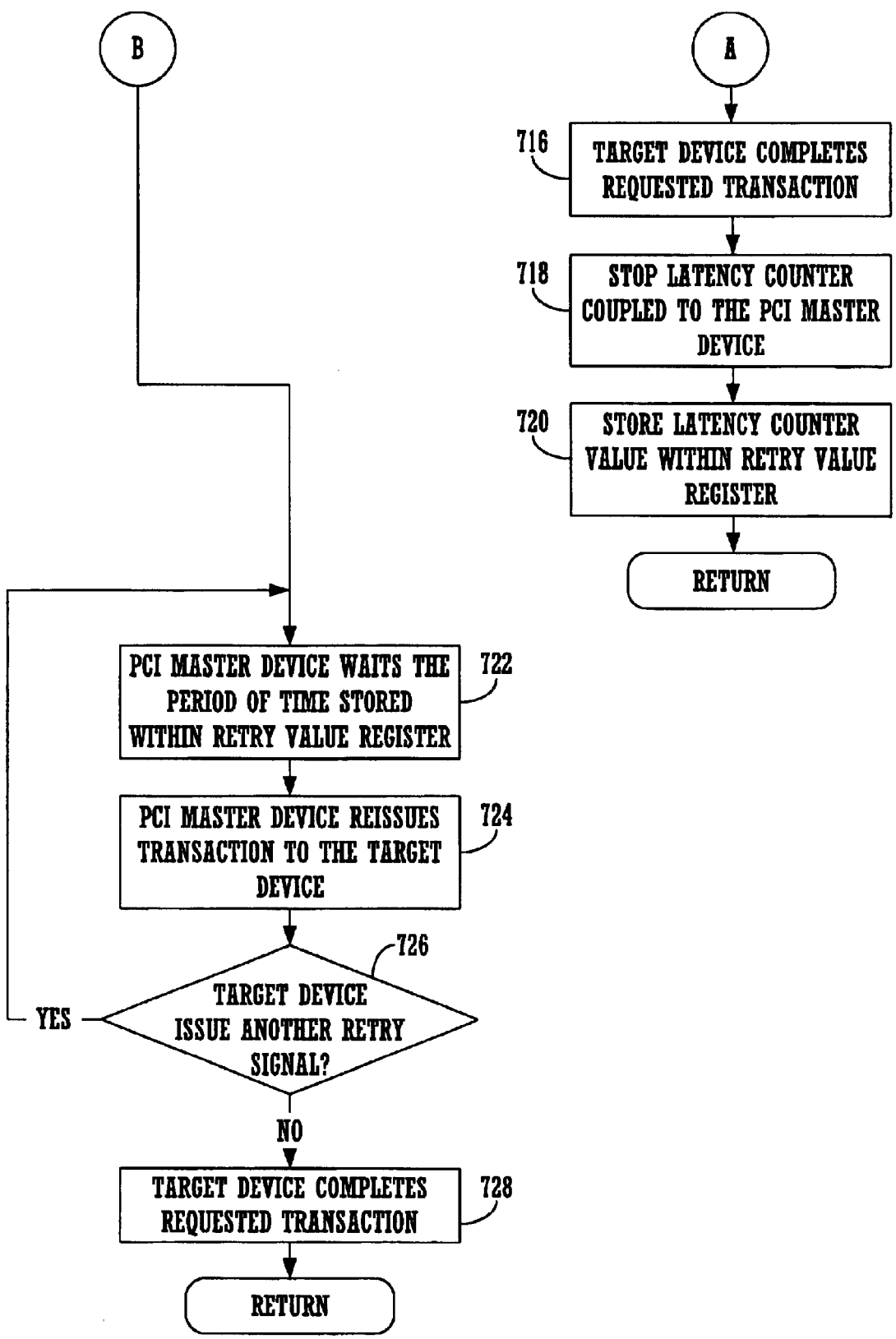

With reference now to FIGS. 7A and 7B, which is a flowchart 700 of steps performed in accordance with one embodiment of the present invention for dynamically adjusting the period of time that a PCI bus master device waits before reissuing a transaction to a target device. Although specific steps are disclosed in flowchart 700 of FIGS. 7A and 7B, such steps are exemplary. In other words, the present invention is well suited to performing various other steps or variations of the steps recited in FIGS. 7A and 7B.

At step 702 of FIG. 7A, within the present embodiment, a PCI bus master device (e.g., 202) issues a transaction signal (e.g., memory read) to a target device (e.g., memory unit 112) over a PCI bus (e.g., 114). It is appreciated that the PCI bus master device and target device are coupled to the PCI bus. Furthermore, it is understood that as part of step 702, the PCI bus master device arbitrates for and is granted ownership of the PCI bus in order to issue the transaction signal.

In step 704, the present embodiment determines whether the target device issued a retry signal to the PCI bus master device. At step 704, if the present embodiment determines that the target device issued a retry signal to the PCI bus master device, the present embodiment proceeds to step 708. However, if the present embodiment determines that the target device did not issue a retry signal to the PCI bus master device at step 704, the present embodiment proceeds to step 706.

At step 706 of FIG. 7A, since the target device has accepted the transaction signal, it completes the requested transaction issued by the PCI bus master device. Upon completion of step 706, the PCI bus master device relinquishes ownership of the PCI bus and the present embodiment of flowchart 700 is exited.

In step 708, the present embodiment determines whether a delay value has been stored within a retry value register (e.g., 408 of FIG. 4A) for more than a specific period of time (e.g., 1 second). It is appreciated that the retry value register is part of a retry timer circuit which is coupled to the PCI bus master device. At step 708, if the present embodiment determines that the delay value has not been stored within the retry value register for more than the specified period of time, the present embodiment proceeds to step 722 of FIG. 7B. However, if the present embodiment determines that the delay value has been stored within the retry value register for more than the specified period of time, the present embodiment proceeds to step 710. It should be understood that one of the main reasons for performing step 708 is to cause the delay value stored within the retry value register to be dynamically changed by the present embodiment at a predefined interval of time.

At step 710 of FIG. 7A, once the PCI bus master device receives the retry signal issued by the target device, the present embodiment resets a latency counter (e.g., 406 of FIG. 4A) and causes it to begin incrementing. Furthermore, upon reception of the retry signal, the PCI bus master device relinquishes ownership of the PCI bus. It should be understood that the latency counter is part of a latency determination circuit which is coupled to the PCI bus master device. Additionally, one of the main purposes of the latency counter is to measure the amount of time which expires between the reception of the first retry signal by the PCI bus master device and the fulfillment of the requested transaction by the target device.

In step 712, the PCI bus master device of the present embodiment reissues the transaction signal to the target device as quickly as possible. It is appreciated that as part of step 712, the PCI bus master device arbitrates for and is granted ownership of the PCI bus in order to reissue the transaction signal.

At step 714 of FIG. 7A, the present embodiment determines whether the target device issued another retry signal to the PCI bus master device in response to the reissued transaction signal. At step 714, if the present embodiment determines that the target device issued another retry signal to the PCI bus master device, the present embodiment proceeds to the beginning of step 712. However, if the present embodiment determines that the target device did not issue another retry signal to the PCI bus master device at step 714, the present embodiment proceeds to step 716 of FIG. 7B.

In step 716 of FIG. 7B, since the target device has accepted the transaction signal, it completes the requested transaction issued by the PCI bus master device. Upon completion of step 716, the PCI bus master device relinquishes ownership of the PCI bus.

At step 718, since the target device has fulfilled the requested transaction, the present embodiment causes the latency counter of the latency determination circuit to stop incrementing. As such, the current value located within latency counter is the measure of the amount of time that expired between the reception of the first retry signal by the PCI bus master device and the fulfillment of the requested transaction by the target device.

At step 720 of FIG. 7B, the present embodiment stores the current delay value of the latency counter within the retry value register of the retry timer circuit. Once the current delay value is stored within the retry value register of the present embodiment, the retry timer circuit together with the retry value register control the reissue period of subsequent transactions of the PCI bus master device.

In step 722, the retry timer circuit of the present embodiment cause the PCI bus master device to wait a period of time before reissuing the transaction signal. It should be appreciated that the period of time that the retry timer circuit causes the PCI bus master device to wait is represented by the delay value stored within the retry value register.

At step 724 of FIG. 7B, upon the expiration of the period of time (delay value) controlled by the retry value register, the retry timer circuit allows the PCI bus master device to reissue the transaction to the target device. It is appreciated that as part of step 724, the PCI bus master device arbitrates for and is granted ownership of the PCI bus in order to reissue the transaction signal.

In step 726, the present embodiment determines whether the target device issued another retry signal to the PCI bus master device in response to the reissued transaction signal. At step 726, if the present embodiment determines that the target device issued another retry signal to the PCI bus master device, the present embodiment proceeds to the beginning of step 722. However, if the present embodiment determines that the target device did not issue another retry signal to the PCI bus master device at step 726, the present embodiment proceeds to step 728.

At step 728 of FIG. 7B, since the target device has accepted the transaction signal, it completes the requested transaction issued by the PCI bus master device. Upon completion of step 728, the PCI bus master device relinquishes ownership of the PCI bus.

Thus, the present invention provides a method and system for optimizing transaction signal retries between a PCI bus master device and a target device communicatively coupled by a PCI bus. Furthermore, the present invention provides a method and system which achieves the above accomplishment and thereby provides the ability to minimize the number of unnecessary transaction signals reissued by the PCI bus master device to the target device over the PCI bus. Therefore, present invention further provides a method and system for optimizing utilization of the PCI bus.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system which dynamically optimizes transaction retries issued by a peripheral component interconnect (PCI) bus master device to a target device coupled to a PCI bus, said system comprising:

a first target device communicatively coupled to a PCI bus and able to issue a first retry signal over said PCI bus;

a PCI bus master device communicatively coupled to said PCI bus and able to issue a first transaction and a second transaction over said PCI bus;

a first latency determination circuit coupled to said PCI bus master device and determines a first delay value equivalent to how much time expires between said PCI bus master device receiving said first retry signal from said first target device and said first target device fulfilling said first transaction; and a first retry timer circuit coupled to receive said first delay value from said latency determination circuit, said first retry timer circuit able to respond when said PCI bus master device receives a second retry signal over said PCI bus corresponding to said second transaction, said first retry timer circuit causes said PCI bus master device to wait said first delay value before reissuing said second transaction over said PCI bus, said first delay value is regulated by said first retry timer circuit, provided said first retry timer circuit stores said first delay value longer than a predefined amount of time, said first latency determination circuit determines a second delay value, wherein said first latency determination circuit changes said first delay value stored within said first retry timer circuit in order to optimizes transaction retries issued by said PCI bus master device.

2. The system as described in claim 1, wherein said second delay value equivalent to how much time expires between said PCI bus master device receiving a third retry signal over said PCI bus and fulfillment of a third transaction issued by said PCI bus master device over said PCI bus.

3. The system as described in claim 1, wherein said first latency determination circuit decreases said first delay value stored within said first retry timer circuit if said first delay value is successfully used a predefined number of times.

4. The system as described in claim 1, wherein said first latency determination circuit increases said first delay value stored within said first retry timer circuit if said first delay value is used unsuccessfully a predefined number of times.

5. The system as described in claim 1, wherein said first latency determination circuit decreases said first delay value stored within said first retry timer circuit after a predefined amount of time has expired.

6. The system as described in claim 1, wherein said first and second transactions are only read transactions.

7. The system as described in claim 1, wherein said first and second transactions are only write transactions.

8. The system as described in claim 1, wherein said first retry timer circuit only responds when said PCI bus master device receives said second retry signal over a direct memory access (DMA) channel supported by said PCI bus master device.

9. The system as described in claim 1, wherein said first retry timer circuit only responds when said PCI bus master device receives retry signals from said first target device.

10. The system as described in claim 1, wherein said first delay value is based on PCI clock cycles.

11. The system as described in claim 1, wherein said first delay value is unrelated to PCI clock cycles.

12. The system as described in claim 1, wherein said first delay value stored within said first retry timer circuit is based on a type of computer said PCI bus master device is coupled to.

13. The system as described in claim 12, wherein said type of computer comprises a network computer.

14. The system as described in claim 12, wherein said type of computer comprises a stand alone computer.

15. The system as described in claim 1, further comprising:

a second latency determination circuit coupled to said PCI bus master device and determines a third delay value equivalent to how much time expires between said PCI bus master device receiving a third retry signal over said PCI bus and fulfillment of a third transaction issued by said PCI bus master device over said PCI bus; and a second retry timer circuit coupled to receive said third delay value from said second latency determination circuit, said second retry timer circuit responds when said PCI bus master device receives a forth retry signal over said PCI bus corresponding to a forth transaction, said second retry timer circuit causes said PCI bus master device to wait said third delay value before reissuing said forth transaction over said PCI bus, said third delay value is regulated by said second retry timer circuit.

16. The system as described in claim 15, wherein:

said first and second transactions are only read transactions; and said third and forth transactions are only write transactions.

17. The system as described in claim 15, wherein:

said first and second retry signals are received over a first DMA channel supported by said PCI bus master device; and said third and forth retry signals are received over a second DMA channel supported by said PCI bus master device.

18. The system as described in claim 15, wherein:

said first retry timer circuit only responds when said PCI bus master device receives retry signals from said first target device; and said second retry timer circuit only responds when said PCI bus master device receives retry signals from a second target device.

\* \* \* \* \*